United States Patent [19]

Driver

[11] 4,233,820
[45] Nov. 18, 1980

[54] FLEXIBLE DRILL PIPE

[76] Inventor: W B Driver, 19 Sheridan Rd., Arnold, Md. 21012

[21] Appl. No.: 12,059

[22] Filed: Feb. 14, 1979

Related U.S. Application Data

[62] Division of Ser. No. 799,088, May 20, 1977, Pat. No. 4,149,391.

[51] Int. Cl.³ .............................................. F16C 1/02
[52] U.S. Cl. ...................................... 64/2 P; 64/2 R; 64/11 B; 138/120
[58] Field of Search ................. 64/2 R, 2 P, 1 S, 1 C, 64/11 B, 15 R, 15 C, 27 C; 138/120; 74/501 R

[56] References Cited

U.S. PATENT DOCUMENTS

| | | | |
|---|---|---|---|
| 312,241 | 2/1885 | Farmer | 64/2 R |
| 2,036,528 | 4/1936 | Kesling | 64/2 R |
| 2,491,820 | 12/1949 | Leibing et al. | 64/2 P |
| 2,655,012 | 10/1953 | McCrery | 64/2 P |
| 3,135,132 | 6/1964 | Bratz | 64/2 R |
| 3,234,723 | 2/1966 | Brown | 64/2 R |
| 3,389,579 | 6/1968 | Werner et al. | 64/2 R |
| 3,464,285 | 9/1969 | McCabe | 64/2R |
| 4,031,713 | 6/1977 | Driver | 64/2 P |
| 4,149,391 | 4/1979 | Driver | 64/2 P |

FOREIGN PATENT DOCUMENTS

| | | | |
|---|---|---|---|
| 2038430 | 2/1972 | Fed. Rep. of Germany | 64/2 R |
| 649905 | 2/1951 | United Kingdom | 64/2 R |

Primary Examiner—Ira S. Lazarus
Assistant Examiner—Magdalen Moy

[57] ABSTRACT

According to the invention a flexible drill pipe constructed of a closed pitch cylindrical spiral coil of wire rod, a female tool joint is attached to one end of the coil of wire rod and a male tool joint is attached to the other end. A plurality of wire wound flexible shafts are laid through the coil of wire rod attaching to the female and male tool joints and enclosing a hollow internal support assembly. The wire wound flexible shafts support the coil of wire rod so it can carry high tension loads and not let it over extend its length. The hollow internal support assembly keeps the coil of wire rod from collapsing under high torsion loads, provides a passage way for drilling fluids to be pumped through the flexible drill pipe, and provides an even distribution of flexibility over the length of the coil of wire rod.

8 Claims, 5 Drawing Figures

FLEXIBLE DRILL PIPE

CROSS-REFERENCE TO RELATED APPLICATIONS

This application is a divisional application to my application Ser. No. 799,088, filed on May 20, 1977 and now U.S. Pat. No. 4,149,391.

BACKGROUND OF THE INVENTION

This invention relates to the drill pipe, shafts or rods used to bore holes in the earth and flexible rods and shafts.

PRIOR ART

There have been attempts to develop a hollow flexible drill pipe before and wire wound flexible hollow pipes have been experimented with but failed because the hollow center collapsed under high torsion loads required in a drilling operation. This happens because the spring wire required to make a flexible hollow pipe is bendable and a pipe made of spring wire needs a core in which the spring wire will not bend or collapse through. A flexible pipe used for drilling holes in the earth requires a hollow center so drilling fluids can be pumped through the pipe to flush cuttings from the hole being drilled. Also wire wound hollow rods can only carry a limited amount of tension loads before their length expands too much and limits the amount of wire wound hollow rod that can be used down a well hole.

SUMMARY OF THE INVENTION

An object of the invention is to provide a wire wound flexible drill pipe which can drill holes, angle holes or curved holes in earth formations.

An object of the invention is to provide a wire wound flexible drill pipe that can drill holes in earth formations while being bent or flexed around a curved pipe or other deflecting tool.

An object of the invention is to provide a hollow internal support assembly that can support a wire wound flexible drill pipe and not let it collapse under the torsion loads required to drill earth formations, provide a passage way so drilling fluids can be pumped through the wire wound flexible drill pipe and provide an even distribution of flexibility over the length of the flexible drill pipe.

Another objective of the invention is to provide a means of supporting a wire wound flexible drill pipe so it can carry high tension loads without over extending its length.

DESCRIPTION OF THE PREFERRED EMBODIMENT

Figure 1:
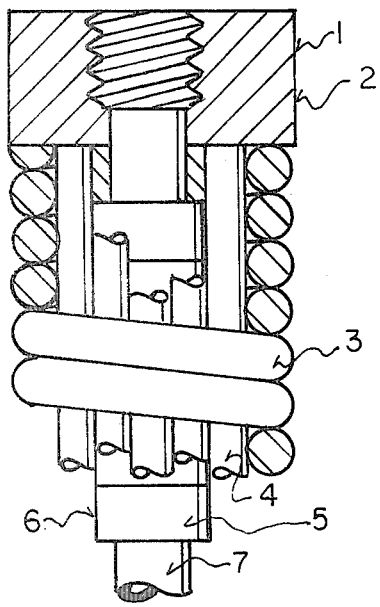
FIG. 1 is partial cross-sections of the end sections of the flexible drill pipe. All the components of the flexible drill pipe are shown.
Figure 1:
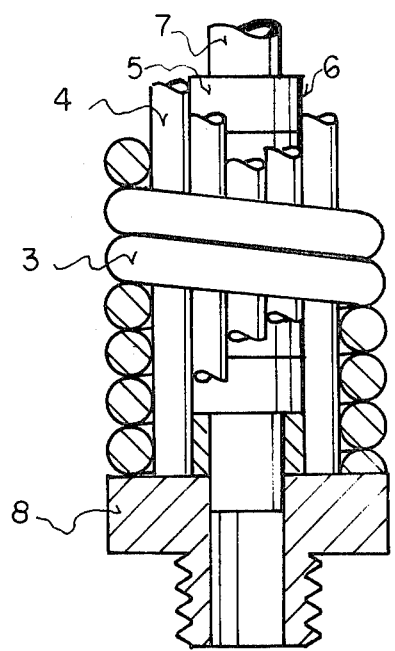
Figure 2:
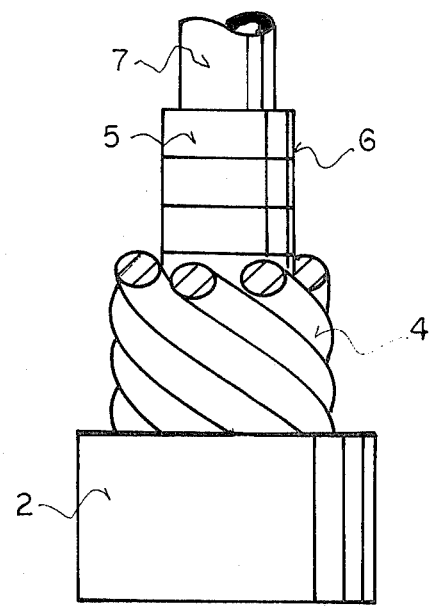
FIG. 2 illustrates the end section of the drill pipe where the female tool joint is attached showing the wire wound flexible shafts being wrapped around the internal support assembly.
Figure 5:
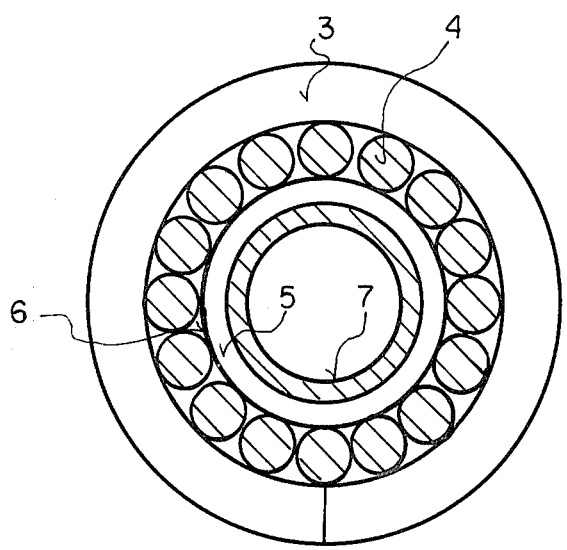
FIG. 5 is a cross-section of the flexible drill pipe.

In FIG. 1 end sections of the flexible drill pipe 1 are shown. The main torsion carrying component is the closed pitch cylindrical shaped coil of wire rod 3. The length of the coil of wire rod 3 extends the length of the flexible drill pipe 1 except for the attaching fittings which are female tool joint 2 and male tool joint 8 attached to the respective end portions of rod 3 and are used for attaching flexible drill pipe 1 to other drill pipe or drilling tools. One of the problems in using wire wound rods for drilling operations is their limitation in carrying large tension loads due to their construction of spring wire which does not require a very large tension load to greatly extend its length. This over extension of length would damage the structure of a wire wound rod used in a drilling operation and cause it to fail. This limitation greatly limits the length of wire wound rod that could be used down a well hole unless it is supported. Since very long lengths of flexible drill pipe 1 would be required for it to be effectively used in earth formation drilling and would have to carry high tension loads, coil of wire rod 3 would have to be supported. This support is provided by a plurality of wire wound solid flexible shafts 4 laid through the coil of wire rod 3 and the respective ends of the flexible shafts 4 are attached to the female tool joint 2 and male tool joint 8. Wire wound solid flexible shafts such as flexible shafts 4, are designed for rotation and a very high degree of flexing and can operate around very small radius of bends. Also wire wound solid flexible shafts are constructed similar to wire cables and will not increase their length under high tension loads. Since flexible drill pipe 1 is designed to operate around small radius of bends and be turned at very high revolutions per minute only the flexible shafts 4 could be used to support tension loads on coil of wire rod 3 and not fail. In FIG. 1 the flexible shafts 4 are shown laid through coil of wire rod 3 parallel to the axial center of coil of wire rod 3. The configuration of the flexible shafts 4 are shown in FIG. 1 and FIG. 5 would provide the maximum tension load support capability. But in cases where short flexible drill pipes 1 would be needed with high flexibility the flexible shafts 4 would be laid through coil of wire rod 3 wrapped around internal support assembly 6 as shown in FIG. 2.

Internal support assembly 6 is constructed of a plurality of tube sections 5 and thin wall hose 7. The tube sections 5 are constructed the same with blunt ends for maximum compression load carrying capability. The tube sections 5 are assembled end to end in contact but not attached through coil of wire rod 3. One end of tube sections 5 at the respective ends of internal support assembly 6 are in contact but not attached to female tool joint 2 and male tool joint 8. The point where the tube sections 5 are in contact is a flex point so the coil of wire rod 3 can be flexible. The tube sections 5 carry compression loads and keep coil of wire rod 3 with flexible shafts 4 from collapsing under high torsion loads. The tube sections 5 are constructed the same so there can be an even distribution of flexibility over the length of coil of wire rod 3. The amount of flexibility that coil of wire rod 3 has is dependent on the length of the tube sections 5 and the diameter of the rod of coil of wire rod 3. For maximum flexibility the length of the tube sections 5 should not be too much longer than the diameter of the rod of coil of wire rod 3, but in cases where flexible drill pipe is small and a small diameter rod is used in coil of wire rod 3 the length of tube sections 5 still should be no more than five times the diameter of the wire of coil of wire rod 3 and no shorter than two times the diameter. Thin wall hose 7 is laid through tube sections 5 and extends into and attaches to the inside wall of female tool joint 2 and male tool joint 8 so drilling fluids can be pumped through flexible drill pipe 1. The flexible shafts 4 provide another function in respect to the tube sections 5 in that the flexible shafts 4 form a barrier that keeps coil of wire rod 3 from twisting through the interface of the tube sections 5 ends under high torsion loads.

Figure 3:
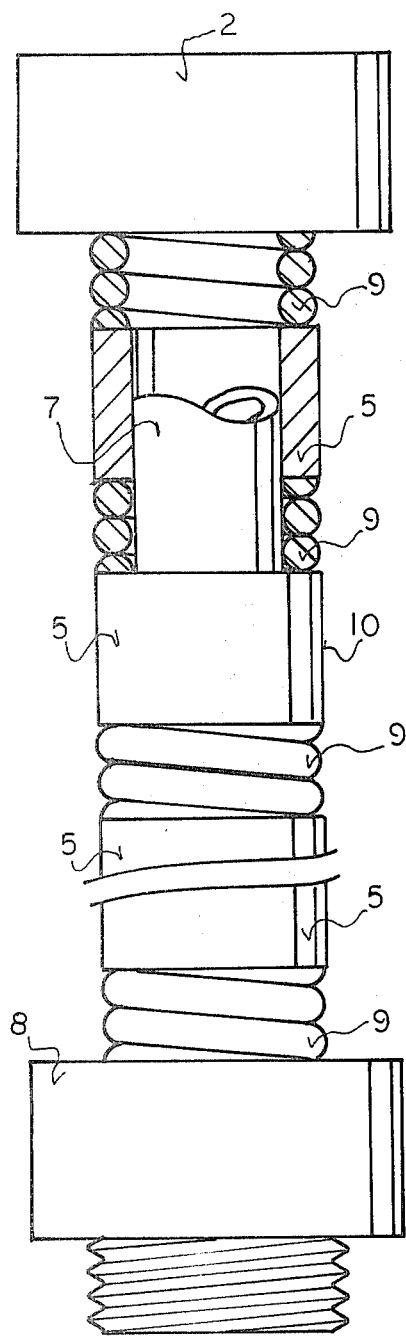
FIG. 3 illustrates a configuration of an internal support assembly that can carry torsion and compression loads.

For maximum compression load carrying capability the diameter of tube sections 5 would be large enough to hold flexible shafts 4 in contact with coil of wire rod 3. Though not shown, an increase in flexibility, for flexible drill pipe could be provided by constructing the diameter of tube sections 5 so tube sections 5 will hold the flexible shafts 4 in contact with coil of wire rod 3 after a partial torsion load has been applied to coil of wire rod 3. In FIG. 3 internal support assembly 10 is a modification of internal support assembly 6 for carrying torsion loads and can be used in place of internal support assembly 6 in flexible drill pipe 1. Internal support assembly 10 consists of a plurality of tube sections 5 and a plurality of closed pitch cylindrical shaped wire coils 9 all assembled together in line and attached end to end. Each tube section 5 is sequenced between wire coils 9 so there will be an even distribution of flexibility over the length of internal support assembly 10. The respective ends of internal support assembly 10 are attached to female tool joint 2 and male tool joint 8 so torsion forces can be transmitted through internal support assembly 10. A thin wall hose 7 is laid through the tube sections 5, wire coils 9 and into and attached to female tool joint 2 and male tool joint 8 so drilling fluids can be pumped through flexible drill pipe 1. For increased flexibility a number of wire coils 9 can be used so there will be a wire coil 9 at each end of internal support assembly 10 and the respective end of the wire coils 9 at each end of internal support assembly 10 would be attached to female tool joint 2 and male tool joint 8. For maximum compression load carrying capability which internal support assembly 10 would also have to provide, the length of the tube sections 5 would be longer than the length of wire coils 9. Though not shown, for optimal compression load carrying capability and flexibility the lengths of tube sections 5 and wire coils 9 would be the same, and for maximum flexibility the length of wire coils 9 would be longer than the length of tube sections 5. All tube sections 5 are constructed the same and all wire coils 9 are constructed so there will be an even distribution of flexibility over the length of coil of wire rod 3. Also the wire coils 9 can be constructed and attached between the tube sections 5 so the lay of the wire in wire coils 9 will be in the opposite direction of the rotation of flexible drill pipe 1 and will cause the diameter of the wire coils 9 to tend to expand when flexible drill pipe 1 is in operation and resist twisting into under high torsion loads. For an even distribution of compression forces over the length of internal support assembly 10 the diameter of wire coils 9 would be the same as the diameter of tube sections 5. Wire coils 9 provide a connection between tube sections 5 that is flexible and can carry compression and torsion loads.

Figure 4:
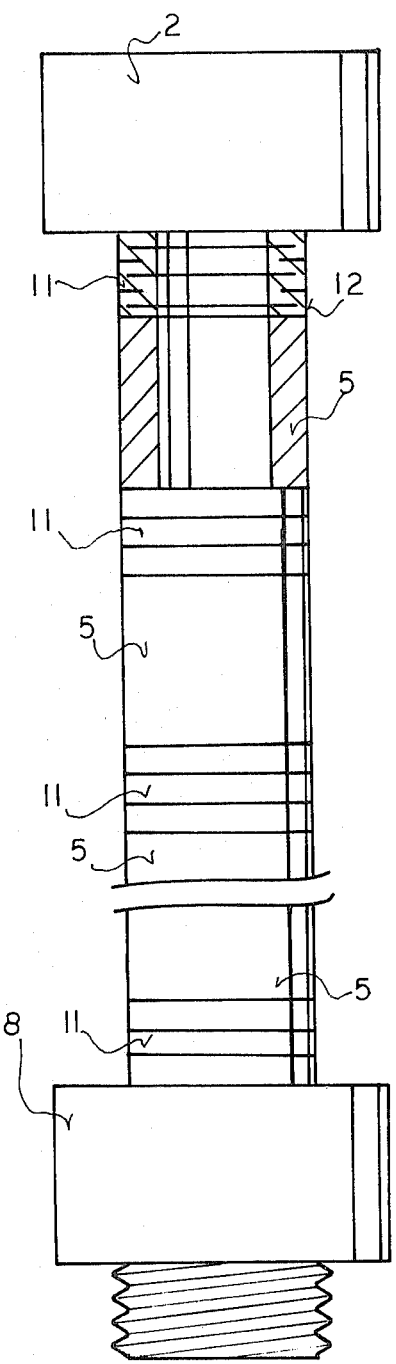
FIG. 4 illustrates another configuration of an internal support assembly that can be used in small diameter flexible drill pipes.

In FIG. 4 internal support assembly 12 is a modification of internal support assembly 6 and used in place of internal support assembly 6 in flexible drill pipe 1 when the diameter of flexible drill pipe 1 is to be so small it would be impracticable to use a thin wall hose 7 to carry drilling fluids through flexible drill pipe 1. Internal support assembly 12 consists of a plurality of tube sections 5 all constructed the same and a plurality of cylindrical shaped bellows 11 all constructed the same. The plurality of tube sections 5 and plurality of bellows 11 are all assembled together in line and attached end to end. Each tube section 5 is sequenced between bellows 11 so there will be an even distribution of flexibility over the length of internal support assembly 12 and a sealed flexible connection between the tube section 5 so drilling fluids can be pumped through the internal support assembly 12. The respective ends of internal support assembly 12 are attached to female tool joint 2 and male tool joint 8 so drilling fluids can be pumped through flexible drill pipe 1. For increased flexibility a number of bellows 11 can be used so there will be a bellows 11 at each end of internal support assembly 12. The respective end of the bellows 11 at each end of internal support assembly 12 is attached to female tool joint 2 and male tool joint 8. For maximum distribution of compression over the length of internal support assembly 12 the diameter of bellows 11 would be the same as the diameter of the tube sections 5. For maximum compression carrying capability the tube sections 5 would be longer than the length of the bellows. Though not shown, but for optimal compression load carrying capability and flexibility the length of the tube sections 5 and bellows 11 would be the same, and for maximum flexibility the length of the bellows 11 would be longer than the length of tube sections 5.

I claim:

1. A flexible drill pipe which comprises, a closed pitch cylindrical shaped coil of wire rod, a plurality of wire wound solid flexible shafts, an internal support assembly, a female tool joint attached to one end portion of said rod, a male tool joint attached to the other end portion of said rod, said internal support assembly being laid through said coil of wire rod and extending from said female tool joint to said male tool joint, said shafts being laid through said coil of wire rod wrapped around said assembly, respective ends of said shafts being attached to said female tool joint and said male tool joint, said assembly supports said shafts and said coil of wire rod under torsion loads and keeps said shafts and said coil of wire rod from collapsing under torsion loads, said assembly providing a means for drilling fluids to be pumped through said drill pipe, said assembly being constructed to provide an even distribution of flexibility over the length of said coil of wire rod.

2. A flexible drill pipe which comprises, a closed pitch cylindrical shaped coil of wire rod, a plurality of wire wound solid flexible shafts, an internal support assembly, a female tool joint attached to one end portion of said rod, a male tool joint attached to the other end portion of said rod, said internal support assembly being laid through said coil of wire rod and extending from said female tool joint to said male tool joint, said flexible shafts being laid through said coil of wire rod surrounding said assembly, respective ends of said shafts being attached to said female tool joint and said male tool joint, said assembly comprises, a plurality of tube sections all constructed the same, a plurality of closed pitch cylindrical shaped spring wire coils all constructed the same, said plurality of tube sections and said plurality of wire coils all assembled together in line attached end to end, each said wire coil being sequenced in said assembly between said tube sections, a torsion compression load carrying flexible connection provided by each wire coil between said tube sections and providing for an even distribution of flexibility over the length of said assembly, respective ends of said assembly being attached to said female tool joint and male tool joint so torsion loads can be carried by said assembly, a thin wall hose laid through said tube sections said wire coils and into and attached to said female tool joint and said male tool joint so drilling fluids can be pumped through said drill pipe, length of said tube sections being longer than said wire coils for maximum compression load carrying capability.

3. A flexible drill pipe according to claim 2 for optimal compression load carrying and flexibility said length of said tube sections being the same as said wire coil, diameter of said wire coils being the same as said tube sections, number of said plurality of said wire coils being such that a wire coil being located at each end of said assembly.

4. A flexible drill pipe according to claim 2 for maximum flexibility said length of said coils being longer than the length of said tube sections.

5. A flexibile drill pipe according to claim 2 for increased compression load carrying capability, said wire coils being constructed and attached to said tube sections such that the lay of said wire of said wire coils will be in the opposite direction of rotation of said drill pipe so diameter of said coils will tend to expand when said drill pipe being rotated under torsion loads.

6. A flexible drill pipe which comprises, a closed pitch cylindrical shaped coil of wire rod, a plurality of wire wound solid flexible shafts, an internal support assembly, a female tool joint attached to one end portion of said rod, a male tool joint attached to the other end portion of said rod, said internal support assembly being laid through said coil of wire rod and extending from said female tool joint to said male tool joint, said flexible shafts being laid through said coil of wire rod surrounding said assembly, respective ends of said shafts being attached to said female tool joint and said male tool joint, said assembly comprises, a plurality of tube sections all constructed the same, a plurality of cylindrical shaped bellows all constructed the same, said plurality of said tube sections and said plurality of said bellows all assembled together in line and attached end to end, each said bellows sequenced in said assembly between said tube sections providing an even distribution of flexibility over the length of said assembly, a sealed flexible connection between said tube section provided by said bellows so said drilling fluids can be pumped through said assembly, respective ends of said assembly being attached to said female tool joint and said male tool joint so said drilling fluids can be pumped through said drill pipe, length of said tube section being longer than said bellows for maximum compression load carrying capability.

7. A flexible drill pipe according to claim 6 for optimal compression load carry and flexibility, said length of said tube section being the same as said bellows, number of said plurality of said bellows being such that a said bellows being located on each said end of said assembly, diameter of said bellows being same as said tube sections for an even distribution of compression loads over the length of said assembly.

8. A flexible drill pipe according to claim 6 for maximum flexibility, length of said bellows being longer than said tube sections.

* * * * *